Figure 1:
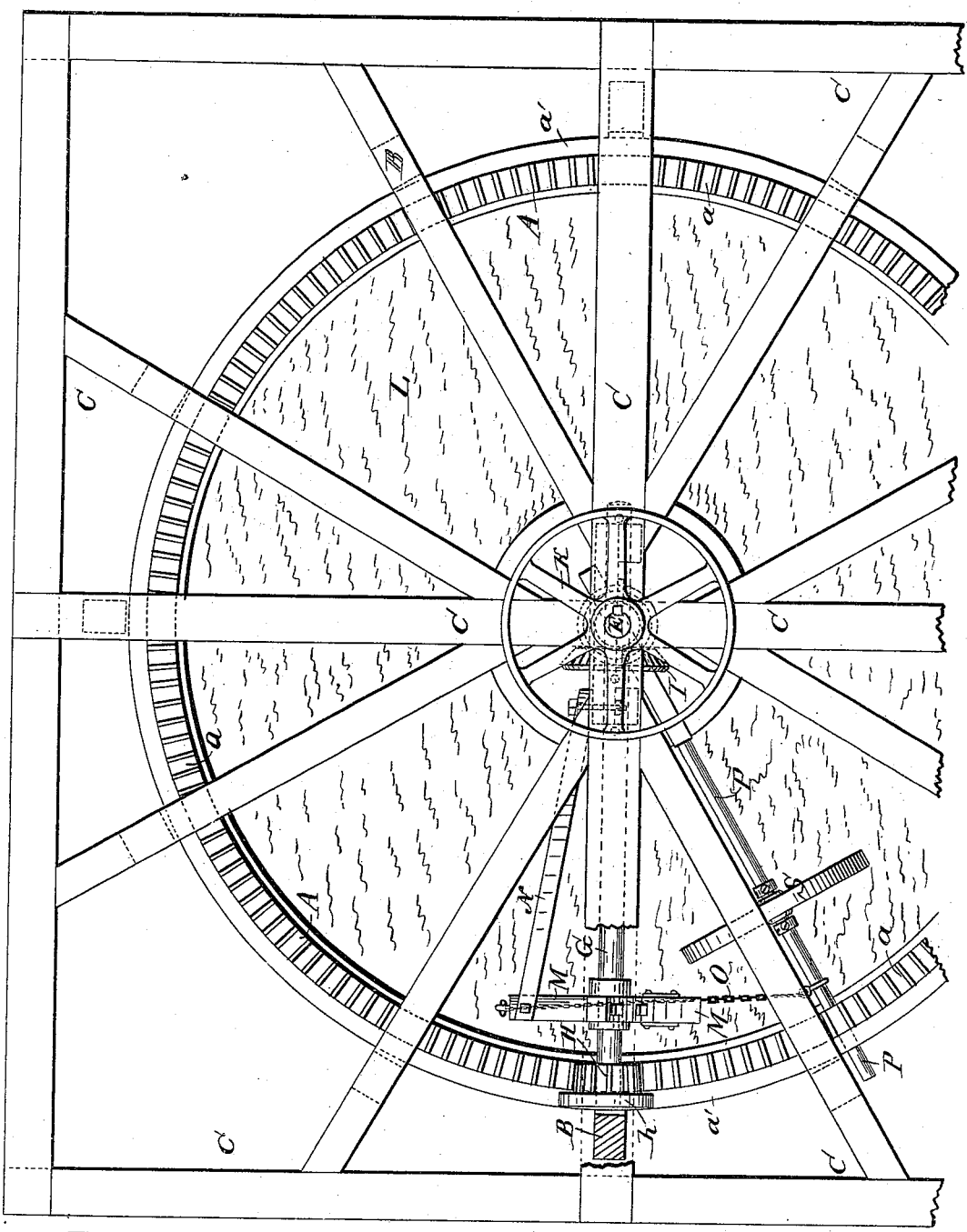

(No Model.)　　　　　　　　　　　　　　　　　2 Sheets—Sheet 1.
W. CRAM.
DRIVING MECHANISM FOR CLAY TEMPERING WHEELS.
No. 307,918.　　　　　　　　　Patented Nov. 11, 1884.

WITNESSES:　　　　　　　　　　　　　INVENTOR:
　　　　　　　　　　　　　　　　　　　　W. Cram
　　　　　　　　　　　　　　　　　BY Munn & Co.
　　　　　　　　　　　　　　　　　　　ATTORNEYS.

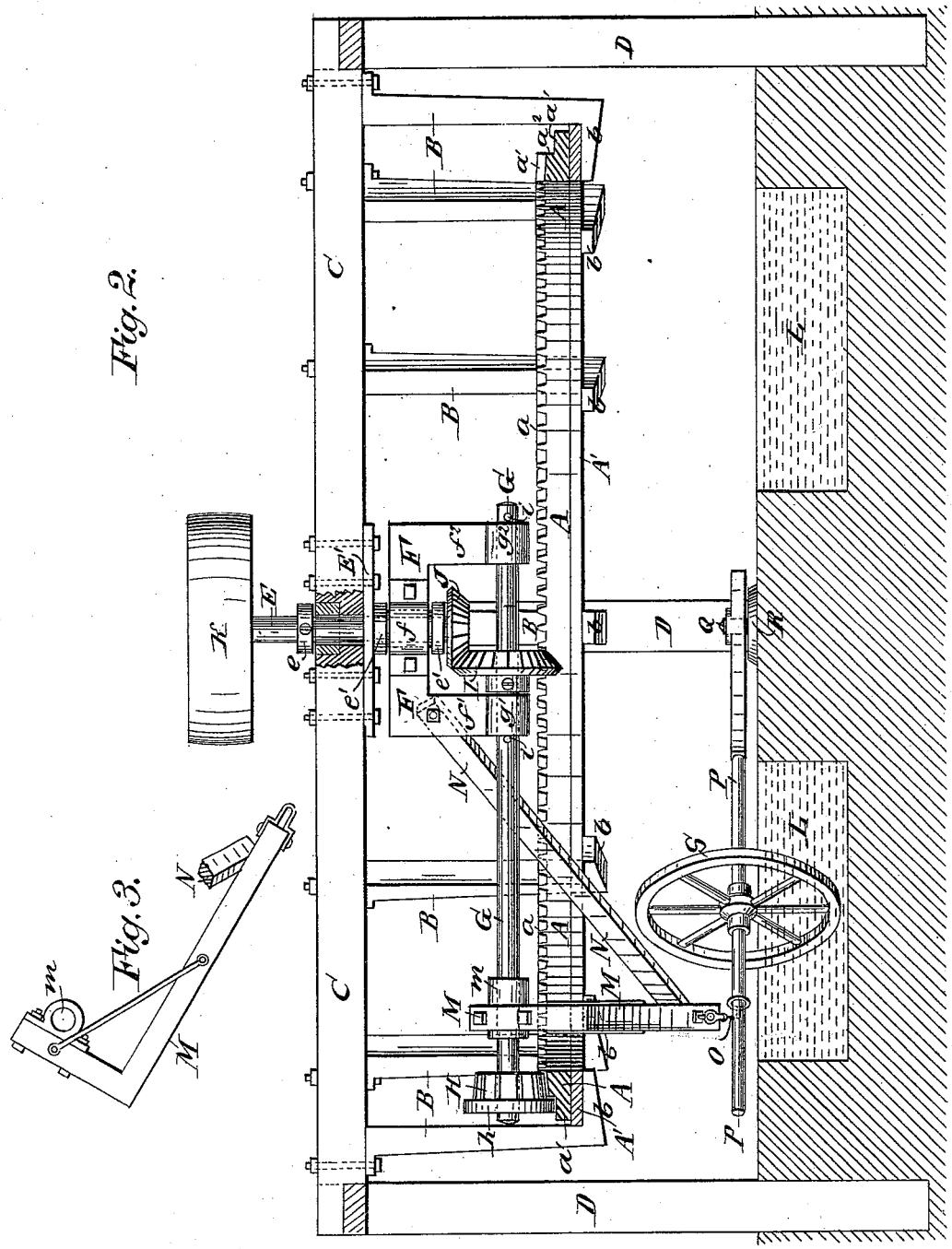

United States Patent Office.

WILLIAM CRAM, OF RALEIGH, NORTH CAROLINA.

DRIVING MECHANISM FOR CLAY-TEMPERING WHEELS.

SPECIFICATION forming part of Letters Patent No. 307,913, dated November 11, 1884.

Application filed July 16, 1884. (No model.)

*To all whom it may concern:*

Be it known that I, WILLIAM CRAM, of Raleigh, in the county of Wake and State of North Carolina, have invented a new and Improved Driving Mechanism for Clay-Tempering Wheels, of which the following is a full, clear, and exact description.

The object of my invention is to provide a simple, durable, and efficient driving mechanism for clay-tempering wheels, whereby the wheels may be operated with less power, and consequently at a reduced cost.

The invention consists in a driving mechanism for clay-tempering wheels, constructed with a fixed circular rack and a horizontal shaft rotated by suitable gearing and carrying a pinion meshing with the teeth of the fixed rack, and said shaft being connected to the shaft of the tempering-wheel.

The invention consists, also, in special arrangements of the mechanism allowing the fixed rack to be supported above the clay-pit and permitting a wider crosswise traverse of the tempering-wheel in the pit without overstraining the gearing.

The invention consists, also, in particular constructions and combinations of parts of the driving mechanism, all as hereinafter fully described and claimed.

Reference is to be had to the accompanying drawings, forming part of this specification, in which similar letters of reference indicate corresponding parts in all the figures.

Figure 1 is a plan view of my improved driving mechanism for clay-tempering wheels, with parts broken away and in section. Fig. 2 is a sectional side elevation of the same, and Fig. 3 is a detail side view of the draft-bar which connects the radial driving-shaft with the shaft of the tempering-wheel.

The letter A indicates a circular rack, consisting of metal segments, made with their teeth $a$ preferably at the top. The segments are or may be bolted to a suitable ring, A′, of wood, and are secured by bolts or otherwise to the feet $b$ of strong hangers B, which are made fast to an overhead frame, C, of timbers or girders, which frame is supported on posts D, set into the ground.

At the center of the frame C, I journal in suitable bearings the vertical shaft E, which has a fixed collar, $e$, coming above the timbers of the frame.

E′ is a plate fixed to the lower side of the upper frame-timbers, and having a gudgeon, $e′$, which forms a lower bearing for the shaft E, and has a circumferential groove, in which I place loosely, by a split bearing at $f$, the yoke or carrier F, which may have but one side or arm, $f′$, in which to support, by a journal-bearing, $g′$, the inner end of a radial shaft, G; but I prefer to make the carrier F with two arms, $f′ f^2$, so as to provide two bearings, $g′$ and $g^2$, for the inner end of the shaft G, as shown, to insure increased stiffness of the shaft and better balance of its driving-gears. From the carrier F the shaft G extends outward radially to the rack A, and the shaft carries fixedly the toothed wheel or pinion H, which meshes with the teeth $a$ of the rack, and I make the pinion with a fixed face flange or wheel, $h$, which projects beyond the ends of the teeth of the pinion, to run upon a horizontal flange, $a′$, on the rack A, outside the teeth $a$, which flanges $h\ a′$ take the weight of the shaft G off of the rack-teeth and make the pinion H run more smoothly and quietly, and the flange $h$, by coming against the shoulder $a^2$ of the rack behind the teeth, also takes any inward endwise thrust of the shaft. Pins $i$ or collars may be placed on the shaft G at the sides of the bearings $g′ g^2$. (See Fig. 2.) A bevel-gear, I, is fixed to the inner end of the shaft G, and meshes with a bevel-gear, J, which is fixed to the lower end of the vertical main driving-shaft E, which carries a pulley, K, to receive a belt from any convenient power, and so that when the shaft E is revolved the shaft G will be rotated, and will also be carried around horizontally over the clay bed or pit L.

On the shaft G the draft bar or lever M is hung loosely by its long bearing $m$, and so that the shaft may rotate in the bearing as the draft-bar is carried around horizontally by the shaft, and a brace, N, extends from the draft-bar to the carrier F, to hold the bar in place on the shaft. The draft-bar is connected by a chain, O, with the shaft P, which is pivoted at its inner end, as at Q, to the support R, located immediately below the shaft E.

On the shaft P is placed loosely, or so as to slide, the clay-tempering wheel S, which may have any suitable construction, and have any approved gearing for causing the wheel to traverse its shaft P, for working the clay in every part of the pit L as the wheel is drawn around by the bar or lever M.

The mechanism for causing the clay-tempering wheel to move along its shaft P is not shown in the drawings, as it forms no part of my invention.

It is evident that by arranging the heavy overhead rack A in the fixed position and connecting the gearing with it, as above described, most of the heavy parts of the mechanism are stationary, and the weight of moving parts is so much lessened as to allow the tempering-wheel to be driven with much less power and friction than in other constructions employing heavy revolving master-wheels and gearing; consequently my improved driving mechanism insures a more economical tempering of the clay; and another important advantage of my construction is that the power may be applied to draw the tempering-wheel around farther from the center of the clay-pit, allowing a wider traverse of the wheel across the pit for working larger batches of clay at once, and without overstraining the gearing, as will readily be understood.

The carrier F may be mounted by its bearing $f$ directly upon the shaft E; but I prefer to place it on the stationary gudgeon $e'$, as above described, to reduce the friction and wear at the journal-bearing of the carrier.

Having thus described my invention, what I claim as new, and desire to secure by Letters Patent, is—

1. A driving mechanism for clay-tempering wheels, constructed with a fixed circular rack and a horizontal shaft rotated by suitable gearing and carrying a pinion meshing with the fixed rack, and said shaft being connected with the shaft of the tempering-wheel, substantially as shown and described.

2. A driving mechanism for clay-tempering wheels, constructed with a fixed circular rack supported above the clay-pit, and a horizontal shaft rotated by suitable gearing and carrying a pinion meshing with the fixed rack, and said shaft being connected with the shaft of the tempering-wheel, substantially as shown and described.

3. A driving mechanism for clay-tempering wheels, constructed with a circular rack supported rigidly above the clay-pit, a horizontal shaft journaled at its inner end in a yoke adapted to revolve around the main driving-shaft and geared to said shaft, a pinion fast on the outer end of the horizontal shaft and meshing with the fixed rack, and connections from the horizontal shaft to the shaft of the tempering-wheel, substantially as shown and described.

4. The combination of the fixed circular rack A, horizontal shaft G, pinion H, and gearing for rotating the shaft, substantially as shown and described.

5. The combination of the fixed circular rack A, having teeth $a$ and flange $a'$, the horizontal shaft G and gearing for rotating it, and the pinion H, meshing with the teeth $a$, and provided with the flange-wheel $h$, running on the flange $a'$, substantially as shown and described.

6. The combination of the fixed circular rack A, the horizontal shaft G, mounted in bearings of a yoke, F, held to revolve around the driving-shaft E, the gears I J, and the pinion H, fast on the outer end of the shaft G, and meshing with the teeth $a$ of rack A, substantially as shown and described.

7. The combination, with the shaft G, journaled in a yoke, F, held to revolve around the main driving-shaft E, and having a pinion, H, meshing with the teeth of the fixed rack A, as specified, of the draw-bar M, held loosely on the shaft G, and connected to the shaft of the tempering-wheel S, substantially as shown and described.

8. The combination, with the draw-bar M, supported on a shaft, G, journaled in bearings of a yoke, F, held to revolve around the main driving-shaft E, of the brace N, connecting the draw-bar with the yoke, substantially as shown and described.

9. The carrier F, mounted loosely to rotate on the pendent gudgeon $e'$, which forms a lower bearing for the main driving-shaft, substantially as shown and described.

WILLIAM CRAM.

Witnesses:
THOS. C. HARRIS,
J. A. JONES.